United States Patent [19]

Hooke

[11] 4,255,500
[45] Mar. 10, 1981

[54] VIBRATION RESISTANT ELECTROCHEMICAL CELL HAVING DEFORMED CASING AND METHOD OF MAKING SAME

[75] Inventor: John W. Hooke, Gainesville, Fla.

[73] Assignee: General Electric Company, Gainesville, Fla.

[21] Appl. No.: 25,060

[22] Filed: Mar. 29, 1979

[51] Int. Cl.³ .............................................. H01M 6/10
[52] U.S. Cl. ....................................... 429/94; 429/178
[58] Field of Search ................................. 429/94, 178

[56] References Cited

U.S. PATENT DOCUMENTS

| | | | |
|---|---|---|---|
| 3,081,366 | 3/1963 | Belove | 429/94 X |
| 3,081,367 | 3/1963 | Field et al. | 429/94 |
| 3,364,069 | 1/1968 | Deschamps | 429/94 X |
| 3,565,690 | 2/1971 | Du Plessix et al. | 429/94 |

*Primary Examiner*—Anthony Skapars
*Attorney, Agent, or Firm*—Morgan, Finnegan, Pine, Foley & Lee

[57] ABSTRACT

An electrochemical cell of the type having a spirally wound electrode assembly contained within a cell case, wherein the case is provided with inwardly directed deformed wall portions which engage the electrode assembly to restrain it against movement within the case. External electrical terminals are physically affixed to the electrode assembly at predetermined locations relative to the terminal ends of the spirally wound electrodes; such terminals are used to physically align the cells prior to deforming the case to ensure that the deformed wall portions of the case are displaced from the terminal ends of the electrodes, thereby avoiding undue stress upon the electrode assembly.

4 Claims, 8 Drawing Figures

VIBRATION RESISTANT ELECTROCHEMICAL CELL HAVING DEFORMED CASING AND METHOD OF MAKING SAME

BACKGROUND OF THE INVENTION

This invention relates to vibration resistant electrochemical cells wherein a generally tubular cell case is inwardly deformed to engage and restrain the cell's electrode assembly against movement.

It is, in many instances, important that sealed electrochemical cells be able to withstand physical jarring, shocks and mishandling. It is additionally important that the cells maintain their physical and electrical characteristics and integrity during the manufacturing process and, thereafter, throughout service.

Electrochemical cells of the sealed type include an electrode assembly disposed within a cell casing. To a great extent, the cell's physical and electrical integrity is ensured by assembling the electrode assembly to a close fit or tolerance between the casing so as to preclude relative movement between the two when the cell is in service. When a firm and uniform pressure is applied to the adjacent positive and negative electrodes of the electrode assembly, performance of the cell is generally improved.

With electrodes that are spirally wound or coiled, wherein initially flat, positive and negative electrode plates are stacked alternately upon one another and then wound in a tightly packed coil, certain manufacturing difficulties may be encountered. First, after they are wound, the electrodes have a tendency to uncoil slightly and thus expand, either prior to or after insertion of the electrode assembly into the casing. Additionally, it is difficult to wind electrodes precisely during mass production so as to obtain a close, uniform tolerance from one electrode assembly to the next. For both of these reasons, endeavoring to achieve a uniformly close fit or tolerance between the electrode assembly and the cell casing may be impracticable.

One method of overcoming the foregoing difficulties is described in Deschamps U.S. Pat. No. 3,364,069 (1968). There, the spirally wound assembly of positive and negative electrodes and interleaved separators is placed into a cylindrical cell casing which, following closure, is permanently deformed by a plurality of grooves impressed in the casing wall. These deformations of the casing wall take the form of either axially spaced annular grooves, a spiral groove about the casing, or a series of grooves extending longitudinally of the cell axis. Although these measures do adequately avoid both undesired unwinding of the electrode assembly and movement of the assembly within the case during service, a major disadvantage is that undue stresses are placed upon the coiled electrode assembly by the grooving steps. Specifically, stresses occur at the outer convolutions of the electrode assembly where the coiled electrode plates terminate. At these locations, the terminal ends of the electrode plates present relatively sharp edges or abrupt discontinuities which result in the creation of high shear forces upon the outer convolutions of the electrode plates when the casing is inwardly deformed. With time, these edges cut through the interleaved separators and cause internal shorting between either the electrode plates or between the electrodes and the case itself. Even though such damage does not appear in every manufactured cell, the reject rate of cells off the assembly line increases, as does the probability of later failure.

The primary object of the present invention is to provide a cell, and a method of manufacturing the cell, which overcomes the disadvantages of the prior art techniques for constructing vibration-resistant cells.

Among the further objects is the provision of a structurally new vibration-resistant electrochemical cell.

SUMMARY OF THE INVENTION

Briefly, the invention embraces a cell wherein the spirally wound plate electrodes are received in a tubular case of deformable material having inwardly directed deformed wall portions engaging the electrode assembly and restraining it against movement within the case, the electrode assembly and case being aligned in a predetermined manner so that the deformed wall portions are displaced from the terminal ends of the outer convolutions of the spirally wound electrodes, thereby avoiding the introduction of damaging stresses upon the electrode assembly.

In preferred embodiments, individual electrodes are formed with tabs extending from one edge of the electrodes such that, when the electrodes are coiled within the assembly, these tabs provide electrical terminal connections at predetermined positions relative to the ends of the outer convolutions of the coiled electrodes. These electrical terminal connections are affixed to external terminals which can be used after the cell is assembled to align the cell relative to an external reference point so that grooves or other deformations of the cell casing will be displaced from the electrode ends. This structure will be more apparent from the accompanying drawings.

DETAILED DESCRIPTION OF PREFERRED EMBODIMENTS

Figure 1:
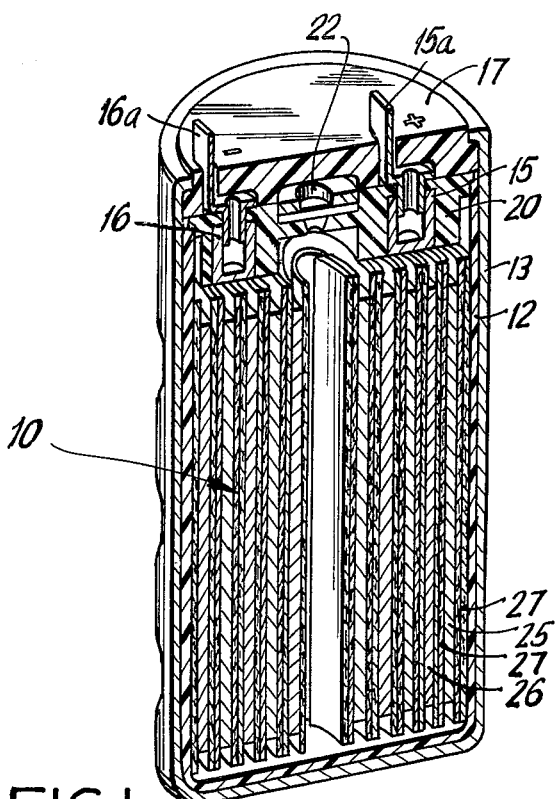
FIG. 1 is a perspective view in cross-section of a sealed rechargeable electrochemical cell applicable to the invention.

Referring to FIG. 1, the various components of a sealed electrochemical cell incorporating the invention are shown in cross-section. The cell comprises a spirally wound electrode assembly designated generally at 10, a sealed inner plastic case 12 completely encasing the electrode assembly 10 and received within a metallic outer case 13 of permanently deformable material such as steel or aluminum. Positive and negative terminal posts 15, 16, respectively, are fixed physically and electrically to the positive and negative electrodes of the electrode assembly 10, in a manner to be explained; these, in turn, are affixed to external terminals 15a, 16a which extend through slots in a nonconductive outer cover 17. An inner cover 20 closes and seals the inner plastic case 12. This cover 20 has cylindrical openings in it for receiving the terminal posts 15, 16, and also contains a resealable safety vent mechanism 22.

As thus far explained, the cell of FIG. 1 is a commercial rechargeable cell employing lead-acid electrochemistry. The plastic case 12 seals the corrosive electrolyte in a liquid-tight container and precludes escape of corrosive quantities of the electrolyte. The outer metal case 13 provides structural integrity to the cell.

Figure 2:
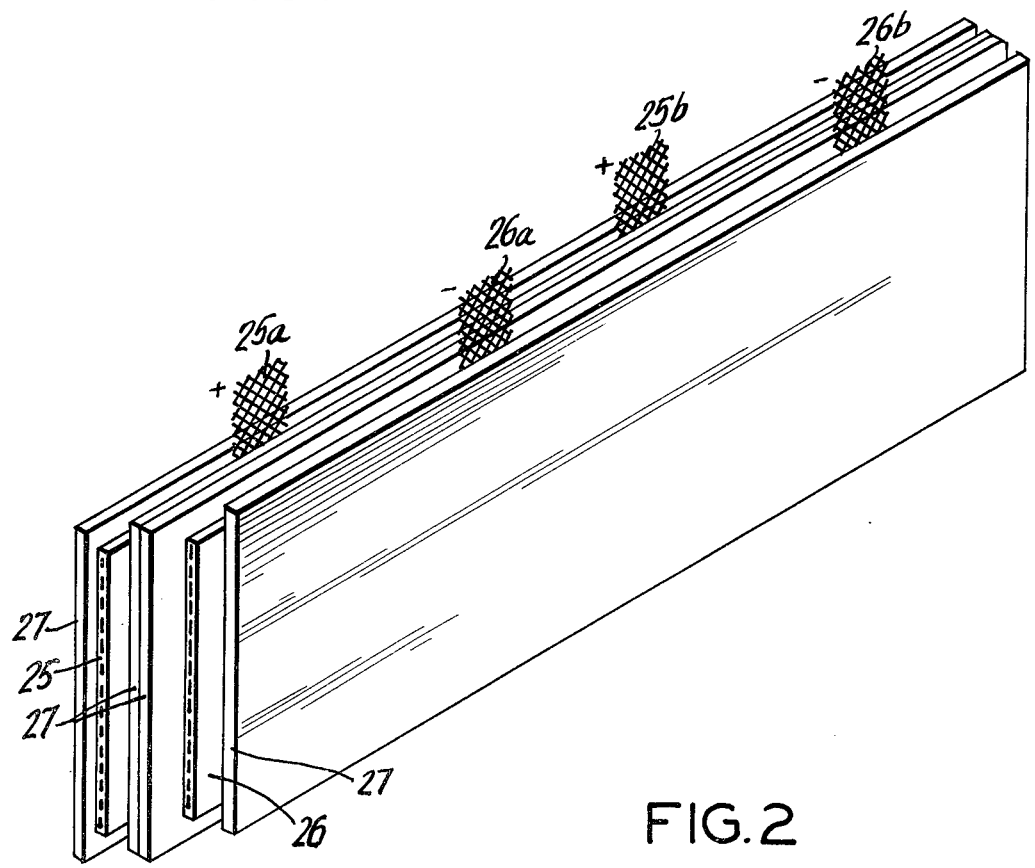
FIG. 2 is a perspective view, partially cut away, of a stack of plate electrodes prior to being spirally wound into an electrode assembly for the cell of FIG. 1.

FIG. 2 represents the stacked positive and negative plate electrodes, together with the fibrous separator layers, prior to winding the electrodes in a spiral coil. This stacked assembly includes a positive electrode plate 25, a negative electrode plate 26, and one or more interleaved layers of separator material 27 surrounding the electrode plates 25, 26. In practice, double layers of separator material 27 are wrapped about each electrode 25, 26 so that, upon winding, four individual layers of separator material will be formed between each adjacent convolution of the electrodes. Electrodes 25, 26 may be of conventional construction. By way of example, the positive electrode comprises a grid of solid lead filled with active material made of lead dioxide paste. Negative electrode 26 similarly may comprise a lead grid filled with sponge lead as the active material.

As illustrated in FIG. 2, the positive electrode plate 25 is formed with tabs 25a, 25b extending from the stacked electrode assembly at its upper edge. Negative plate electrode 26 includes similar tabs 26a, 26b extending from the upper edge of the electrode plate. Tabs 25a, 25b and 26a, 26b are formed integrally with the lead grid which forms the substrate for electrodes.

The tabs extending from the positive plate 25, and those extending from the negative plate 26 have a predetermined spacing from each other and from the terminal ends of the electrode plates. This predetermined spacing ensures (a) that the tabs 25a, 25b will be circumferentially aligned at the same side of the coiled electrode assembly upon winding, (b) that the tabs 26a, 26b will both be aligned at an opposite side of the electrode assembly; and (c) that the terminal ends 30, 31 of the respective positive and negative electrodes will have a predetermined location relative to these tabs in the wound electrode assembly.

Figure 3:
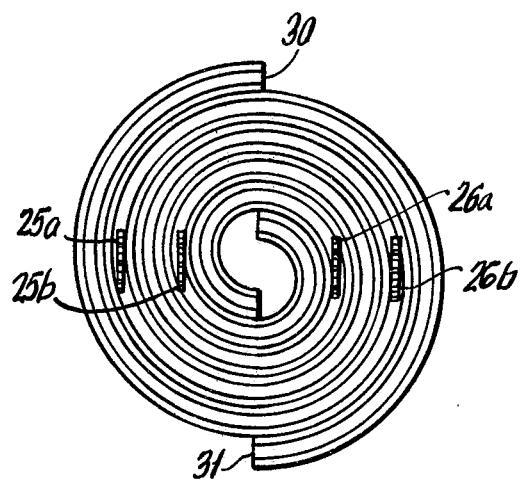
FIG. 3 is a plan view of the cell plate electrodes following winding.

FIG. 3, which is a plan view of the wound electrode stack of FIG. 2, shows the foregoing relationship of the tabs and electrode ends. It will be seen that the tabs 25a, 25b are circumferentially aligned and spaced apart, as are the negative electrode tabs 26a, 26b. Positive and negative electrode plate ends 30, 31 terminate at positions approximately ¼ turn (90°) from the circumferential location of the tabs and thus terminate generally at opposite sides of the coiled cylindrical electrode assembly and intermediate the circumferential positions of the tabs. The tabs, which serve as current collectors for the electrode assembly, thus provide an indication and reference point for locating the electrode ends 30, 31 after the cell has been assembled and sealed.

Figure 4:
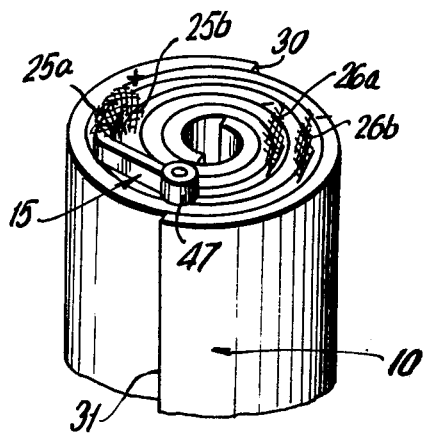
FIG. 4 is a partial perspective view of a wound electrode assembly, showing a terminal post connected to the positive plate electrode.

FIG. 4 illustrates the coiled electrode assembly in which one terminal post 15 has been affixed to the positive set of tabs 25a, 25b. A similar post (not shown) is affixed to the negative tabs 26a, 26b, the terminal posts being secured to the tabs by plasma arc welding, soldering, etc.

It will be seen from FIGS. 3 and 4 that the tabs 25a–b, 26a–b bear a known fixed relationship to the electrode plate ends 30, 31 at the outer convolutions of the wound electrode assembly. Likewise, since the terminal posts 15 and 16 are secured directly and permanently to these tabs, the terminal posts also bear a fixed relationship to the electrode plate ends 30, 31. By way of example, and as illustrated in FIG. 4, the end 47 of the terminal post 15 is aligned with the electrode edge 31 and the end of the terminal post 16 (not shown) is aligned with the plate edge 30.

The electrode assembly 10 is commonly maintained in its coiled condition during the assembly procedure by an adhesive strip (not shown) wound about the outside of the assembly. It should be remarked that the particular form of the electrodes, the method of winding them and the manner and precise location of the terminal post do not per se constitute a part of the invention. What is important is that the terminal tabs 25a–b, 26a–b and posts 15, 16 bear a fixed physical relationship to the terminal ends 30, 31 of the electrode plates, since once the electrode is assembled, it is by the external terminals 15a, 16a that the precise location of the plate ends may be determined. Moreover, as will be explained shortly, the terminals 15a, 16a may be used to align the cell relative to the equipment used to deform the cell casing.

The next steps in the assembly of the cell are to affix the external rivet terminals 15a, 16a to the terminal posts 15, 16, respectively. This operation also results in the fastening of the plastic cover 20 to the electrode assembly (see FIG. 1). Next the electrode assembly, together with terminals 15a, 16a and cover 20, is inserted into the plastic case 12. Thereafter the cover 20 is sealed by ultrasonic welding techniques to the case 12, and the plastic-encased electrode assembly loaded into the metal cell case 13. Outer cover 17 is placed over the top of the plastic inner cover 20 so that the top rim of the metal case 13 can be bent inwardly in a rim to grip the outer cover 17 and retain the entire assembly within the metal case.

In accordance with the invention, following closure of the cell, the wall of the metal casing 13 is deformed inwardly so that deformed wall portions of the plastic cell case 12 engage the electrode assembly 10 and restrain it against movement within the case. These inwardly deformed wall portions not only protect the electrode assembly against physical movement due to mishandling or rough service, but also maintain the closely packed integrity of the alternating positive and negative electrodes and interleaved separators 27.

Figure 5A:
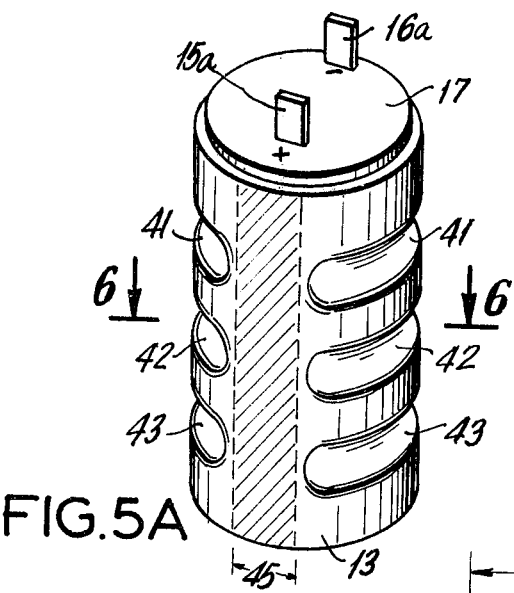
FIGS. 5A and 5B are preferred embodiments of electrochemical cells made in accordance with the invention.

A finished cell is illustrated in FIG. 5A, wherein the deformed casing consists of a plurality of annular grooves 41, 42, 43 that are spaced-apart in the direction of the cell axis and are discontinuous at points on the wall of the case corresponding to the internal location of the terminal ends 30, 31 of the plate electrodes. It will be recalled that these terminal ends are generally in alignment with the electrical terminals 15a, 16a and, as illustrated in FIG. 5A, the annular grooves are absent from a zone 45 (bounded by the phantom lines and shaded), this zone being aligned with the terminals 15a, 16a and sufficiently wide so that no undue shear forces are created during the case deforming procedure.

Figure 5B:
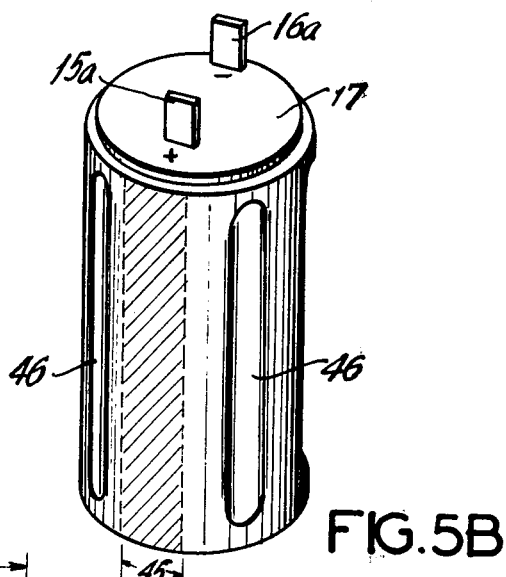

An alternative embodiment of the cell in accordance with the invention is shown in FIG. 5B. There, the inwardly deformed wall portions of the case are comprised of a plurality of circumferentially spaced, longitudinally extending grooves 46.

Again, such grooves are absent from zones (shaded areas 45) aligned with the terminals 15a, 16a.

Figure 6:
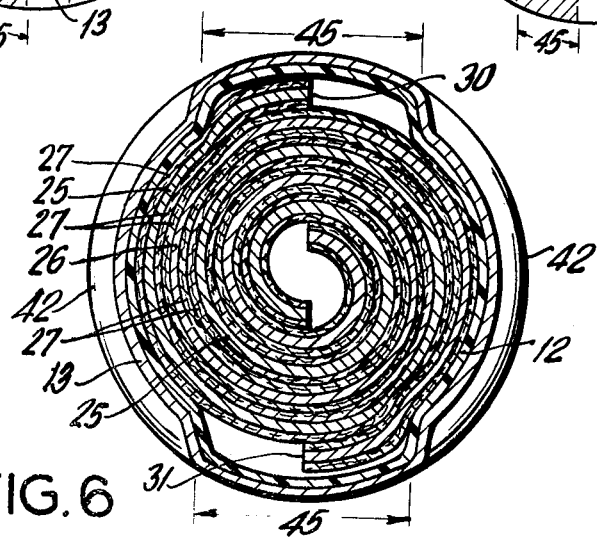
FIG. 6 is a cross-sectional view of the cell of FIG. 5A, taken generally along the lines 6—6.

The cross-sectional view of FIG. 6 further illustrates the relationship between the inwardly deformed wall portions 42 (FIG. 5A) of the cell case 12, 13 and the terminal ends 30, 31 of the electrodes. These terminal ends can be seen to fall in the zones 45 which are free of the inwardly directed wall portions of the case. The inwardly deformed wall portions outside of these zones, on the other hand, firmly engage the outer convolutions of the electrode assembly to restrain it against unwinding or movement. In this manner, greater restraining forces may be applied to the electrode assembly without risk of electrode damage.

Figure 7:
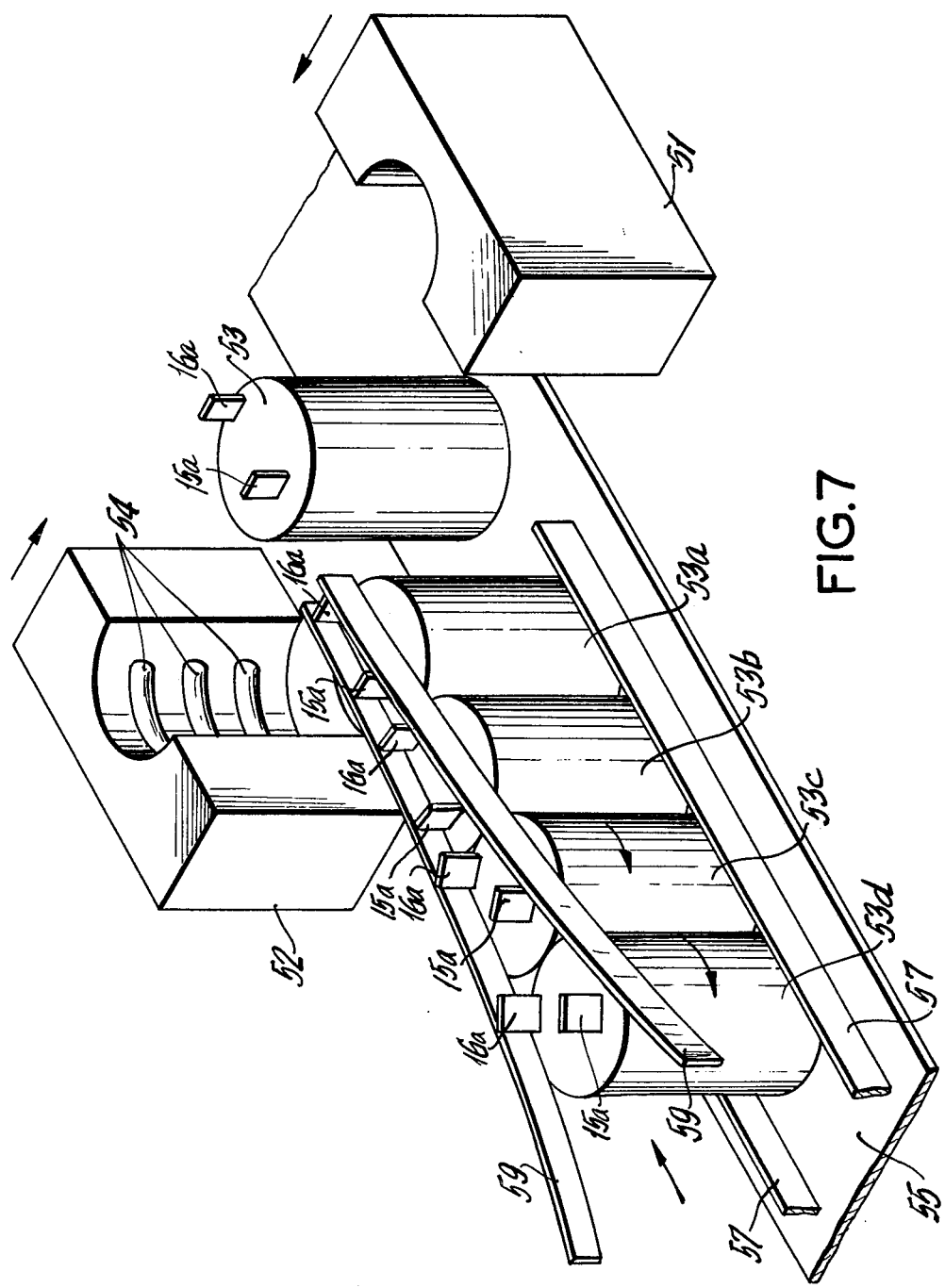
FIG. 7 is a perspective pictorial representation of apparatus which may be used to carry out a process for making the cells typified in FIGS. 5A and 5B.

Referring now to FIG. 7, there is illustrated in schematic form representative apparatus which may be used to deform the cell walls to produce the cell shown in FIG. 5A. A pair of movable dies 51, 52 is situated on opposite sides of an assembly or production line along which sealed cells are advanced. One cell 53 is shown positioned between the dies, each of which is provided with a series of spaced semicircular projections 54 extending forwardly of the die wall. Upon simultaneous inward movement of the two dies, these projections deform the cell casing in the form of the discontinuous annular grooves 41–43.

Suitable means (not shown), such as hydraulic pistons, move the dies simultaneously into engagement with the casing wall. Preferably, the means which actuate the dies are operated in synchronism with movement of the cells along the assembly line. For example, the cells 53a . . . 53d may be transported in a vertical position along a conveyor path 55 or chute between appropriate guides 57. As the cells 53a . . . 53d approach the manufacturing station where the dies 51, 52 are located, they may be contacted by convergent guides 59, depending on the orientation of the cell terminals. These guides 59 are so spaced and dimensioned that they will engage the upstanding terminals 15a, 16a of the approaching cells and circumferentially orient (rotate) any nonaligned cells into proper alignment for advancement into the case-deforming dies. Thus, for example, cells 53c, 53d are rotated clockwise (as viewed from the top) as they advance toward the dies, this rotation being obtained by a reaction between the spaced convergent guides 59 and the cell terminals.

Although the invention has been described with reference to preferred embodiments and typical means for practicing the invention, certain modifications and variations may be made without departing from the novel concepts disclosed. The means illustrated in FIG. 7 is, of course, representative and highly schematic. It is understood that suitable mechanisms, known per se in the art, are provided for restraining cells 53a . . . 53d while permitting cell 53 to advance or be placed in an appropriate position between dies 51, 52. Moreover, the means for advancing and aligning these cells seriatum may differ from that shown in FIG. 7. The conveyor 55, for example, may take the form of a chute or channel whereby the cells advance by gravity. In other alternatives, electromechanical or photosensing devices may be used to sense the position of the terminals and align the cells in the case deforming means. It should also be apparent to those in the art that the external terminals need not take the form shown in the preferred embodiments described herein, but may assume a number of configurations known in the art, the important thing being that the cell exterior provide an unambiguous indication and/or reference point for determining the position of the electrode ends at the cell interior.

What I claim is:

1. In a vibration resistant electrochemical cell including an electrode assembly of spirally wound plate electrodes having at least one end terminating among the outer convolutions of the electrode assembly, and further having internal terminal connections at predetermined locations relative to said end the improvement comprising the combination of:
   radially asymmetric external terminals associated with said internal terminal connections, and
   a tubular case of deformable material receiving said electrode assembly and having inwardly directed deformed wall portions firmly engaging said electrode assembly and restraining it against movement within the case,
   said external terminals having a fixed circumferential orientation relative to said case so that said deformed wall portions are displaced from said electrode terminal and by a known amount sufficient to avoid the exertion of damaging mechanical stress upon the assembly at said terminal end.

2. The electrochemical cell of claim 1, wherein said deformed wall portions comprise a plurality of circumferentially spaced, inwardly directed deformations.

3. The electrochemical cell of claim 1, wherein said deformed wall portions comprise at least one annular groove which is discontinuous at points on the wall of said case corresponding to the location of said electrode terminal end.

4. The electrochemical cell of claim 3, wherein said deformed wall portion comprises a plurality of inwardly projecting annular grooves mutually spaced apart in the direction of the axis of the cell, each of said grooves being discontinuous at locations corresponding to the location of said electrode terminal end.

* * * * *